United States Patent

Correale, Jr. et al.

[11] Patent Number: 6,001,662
[45] Date of Patent: Dec. 14, 1999

[54] METHOD AND SYSTEM FOR PROVIDING A REUSABLE CONFIGURABLE SELF-TEST CONTROLLER FOR MANUFACTURED INTEGRATED CIRCUITS

[75] Inventors: Anthony Correale, Jr., Raleigh; James Norris Dieffenderfer; Trevor Scott Garner, both of Apex; Ronald William Kohake; Ketan Vitthal Patel, both of Cary, all of N.C.

[73] Assignee: International Business Machines Corporation, Armonk, N.Y.

[21] Appl. No.: 08/982,440

[22] Filed: Dec. 2, 1997

[51] Int. Cl.⁶ .................................................. H01L 21/00
[52] U.S. Cl. ................................................. 438/11; 438/18
[58] Field of Search .................................. 438/11, 14, 15, 438/17, 18, 107

[56] References Cited

U.S. PATENT DOCUMENTS

| | | | |
|---|---|---|---|
| 4,594,711 | 6/1986 | Thatte | 371/25 |
| 4,782,486 | 11/1988 | Lipcon et al. | 371/21 |
| 5,138,619 | 8/1992 | Fasang et al. | 371/21.1 |
| 5,222,066 | 6/1993 | Grula et al. | 371/21.1 |
| 5,254,482 | 10/1993 | Fisch | 438/18 |
| 5,301,156 | 4/1994 | Talley | 365/201 |
| 5,315,241 | 5/1994 | Ewers | 438/17 |
| 5,374,888 | 12/1994 | Karasawa | 438/17 |
| 5,386,383 | 1/1995 | Raghavachari | 365/189.05 |
| 5,388,104 | 2/1995 | Shirotori et al. | 371/21.1 |
| 5,389,556 | 2/1995 | Rostoker et al. | 438/17 |
| 5,442,641 | 8/1995 | Beranger et al. | 371/21.2 |
| 5,475,815 | 12/1995 | Byers et al. | 395/183.08 |
| 5,483,175 | 1/1996 | Ahmad et al. | 438/18 |
| 5,535,164 | 7/1996 | Adams et al. | 365/201 |
| 5,570,374 | 10/1996 | Yau et al. | 371/22.5 |
| 5,642,307 | 6/1997 | Serigan | 438/18 |
| 5,654,895 | 8/1997 | Bach et al. | 438/18 |
| 5,693,540 | 12/1997 | Turner et al. | 438/11 |
| 5,723,874 | 3/1998 | Baker eta l. | 438/18 |
| 5,787,190 | 7/1998 | Peng et al. | 438/17 |

*Primary Examiner*—Kevin M. Picardat
*Attorney, Agent, or Firm*—Daniel E. McConnell; Felsman, Bradley, Gunter & Dillon LLP

[57] ABSTRACT

A method and system for manufacturing integrated circuit devices having multiple memory units embedded therein. Initially, a single reusable configurable test circuit is fabricated within an integrated circuit device. A number and type of each memory unit embedded within the integrated circuit device are then identified. Finally, the single reusable configurable test circuit is configured, in response to the identifying of a number and type of each memory unit, such that only one test circuit is required for use with multiple integrated circuit devices having multiple diverse memory units embedded therein. The single reusable configurable test circuit can be placed within or outside a fixed core of the integrated circuit device. In addition, the single reusable configurable test circuit can include array built-in self test (ABIST) controller which includes a hierarchical memory configuration that includes a state machine, address counter, compare register and data pattern generator.

22 Claims, 9 Drawing Sheets

METHOD AND SYSTEM FOR PROVIDING A REUSABLE CONFIGURABLE SELF-TEST CONTROLLER FOR MANUFACTURED INTEGRATED CIRCUITS

BACKGROUND OF THE INVENTION

1. Technical Field

The present invention relates, in general, to improved semiconductor devices. In particular, the present invention relates to a configurable self-test for integrated circuit devices.

2. Description of the Related Art

As integrated circuitry has advanced, more and more circuit devices, and consequently more circuits and circuit functions, can be placed on a single silicon wafer microchip. These circuits perform many different functions, and the circuits must be tested before they are utilized in particular products. As integration has increased over time, memory arrays have been incorporated with logic on the same silicon chip. The dense integration of logic circuitry, such as very-large-scale integration (VLSI), on silicon microchips has thus created immense problems for the test engineer. With advancing developments of VLSI semiconductor circuits, the number of circuit elements, such as gates, flip-flops, and memory cells, on an integrated chip, is expanding to very large numbers. This expansion has given rise to increasing problems in testing the chips, both in their original manufacturing test and during their use in the field.

The complexity and cost of test generation and fault simulation increases with an increasing number of circuit elements. It is well known in the art of integrated circuits that test generation and fault simulation cost for a chip grows approximately proportionally to the third power of the number of gates and flip-flops on the chip. Similarly, the length and execution time of tests increase with the increasing complexity of chips. Since the chip manufacturing cost is expected to decrease over time as production increases, the testing cost is a significant portion of the overall chip cost.

In order to manage functional testing of such complex circuitry, a VLSI chip must be divided into independently testable blocks. Defective VLSI circuits can then be screened utilizing a variety of tests. For example, to increase the speed of testing on-chip memory, the input and output (i.e., I/O) of the memory arrays have been multiplexed with primary I/O's so that the tester has direct control of the array inputs and can direct observability of the array outputs. One problem with such a testing approach is that testing of arrays must be performed serially if there are not enough I/O's on the chip to test multiple arrays in parallel. Such a method is expensive and also time consuming, and generally inefficient due to the fact that the chip cannot be tested in parallel. Performance degradation is also an artifact of this type of testing.

To alleviate this costly bottleneck on the tester, the concept of Array Built In Self-Test (ABIST) was introduced. ABIST is specialized logic, implemented on the same silicon with the memory array, designed to detect manufacturing defects in memory arrays. The ABIST logic writes and reads patterns to and from the memory array while incrementing and decrementing through the entire address range. Comparisons are performed after each read of the array to determine if the write and read operations were successful. Miscompares indicate a defect in the memory array silicon.

In previous ABIST testing designs, a separate ABIST testing unit was provided on an integrated circuit for each device sought to be tested. This approach provided the advantage of testing multiple arrays concurrently, such that test time was limited to the time necessary to test the largest memory array at the expense of silicon area taken by each ABIST controller. Thus, a separate ABIST controller was needed for each memory device.

Other ABIST testing designs provided for a single ABIST controller which could be utilized to test a variety of memory devices of varying sizes. However, the single ABIST controller could only be designed and utilized for a specific combination of arrays and fixed array sizes. Such an approach was limited because a mere change in a single array size could render the ABIST controller inoperable.

As integration continues to improve, the utilization of core-plus ASIC (C+A) or "systems-on-silicon" designs, well known in the art of integrated circuit testing, have increased, which in turn has increased the need for design reuse. This is particularly evident in testing designs such as C+A designs that require the utilization of a fixed core that has various sized memory arrays attached as needed for a desired application. However, in such cases, utilizing the older testing approaches discussed above in conjunction with designs such as C+A designs presents difficulties. The method of having separate ABIST controllers for each array wastes silicon area and requires a separate design for each different sized array. The method of providing a single controller for fixed array sizes reduces area but must be redesigned for each different sized combination. The same problems are also evident in non-core plus ASIC designs where time-to-market is an important consideration.

From the foregoing, one can appreciate that a need exists for an ABIST design that can be utilized for testing integrated circuit devices of different sized memory arrays. Such an approach is solved by the invention described herein, a single reusable configurable ABIST controller that can be utilized for testing a variety of different sized memory arrays, either within a fixed core or outside the fixed core.

SUMMARY OF THE INVENTION

It is therefore one object of the present invention to provide for an improved semiconductor device.

It is therefore another object of the present invention to provide an improved selftest for integrated circuit devices.

It is yet another object of the present invention to provide an improved configurable built in self-test for integrated circuit devices which can be utilized for testing memory devices of varying sizes without regard for $2^n$ multiples, shapes and hierarchies.

The above and other objects are achieved as is now described. Initially, a single reusable configurable test circuit is fabricated within an integrated circuit device. A number and type of each memory unit embedded within the integrated circuit device are then identified. Finally, the single reusable configurable test circuit is configured, in response to the identifying of a number and type of each memory unit, such that only one test circuit is required for use with multiple integrated circuit devices having multiple diverse memory units embedded therein. The single reusable configurable test circuit can be placed within or outside a fixed core of the integrated circuit device. In addition, the single reusable configurable test circuit can include an array built-in self test (ABIST) controller which includes a hierarchical memory configuration that includes a state machine, address counter, compare register and data pattern generator.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of a preferred embodiment when read in conjunction with the accompanying drawings, wherein:

DETAILED DESCRIPTION OF PREFERRED EMBODIMENT

Figure 1:
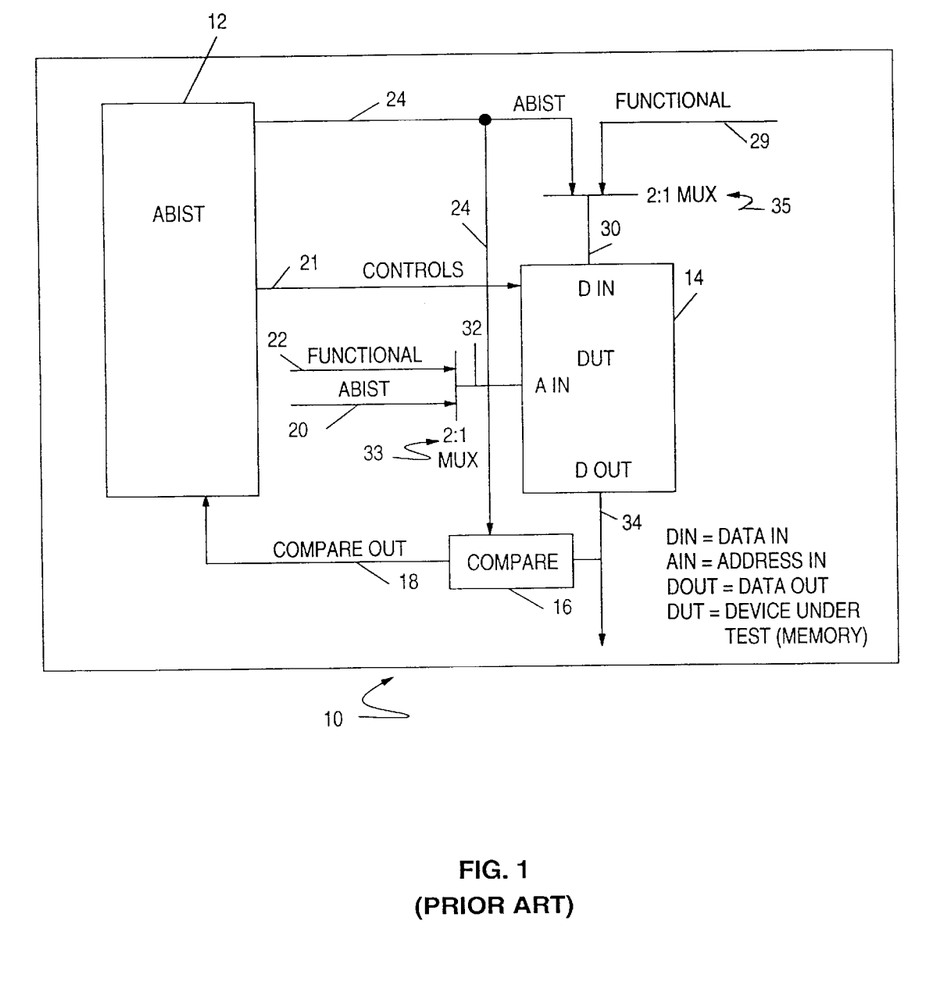
FIG. 1 illustrates a prior art ABIST controller interfaced with a memory array.

With reference now to the figures and in particular with reference to FIG. 1, there is depicted a prior art block diagram 10 illustrative of an ABIST controller 12 interfaced with a memory array 14. Memory array 14 is labeled as DUT, which is an acronym representative of a "device under test." ABIST controller 12 is coupled to compare logic 16 via a compare out line 18. Compare logic 16 provides data as input to ABIST controller 12 via compare out line 18. ABIST controller 12 is further coupled via a "controls" line 21 to memory array 14. Output control data is provided by ABIST controller 12 via "controls" line 21 to memory array 14. In addition, ABIST data is supplied by ABIST controller 12 via ABIST line 20 to a 2:1 multiplexer circuit 33. Functional data is also provided from an outside source (i.e., not shown) to the multiplexer. (This functional data is supplied to multiplexer circuit 33 via functional data line 22.) The multiplexer is responsible for processing multiplex operations. Multiplex operations allow for the selectability of several signals along a single path without any loss of identity of an individual signal. The various signals are input to the multiplexer, which is utilized to allocate a transmission path to the input according to a particular parameter of signal. Those skilled in the art will appreciate that the term "line" as utilized herein may refer to a single line or multiple lines which form, for example, address line outputs or inputs to particular devices or circuit configurations. The choice of whether or not a single "line" is actually utilized, versus multiple lines, is left to an implementor of a preferred embodiment of the present invention.

Output from the multiplexer is then fed via line 32 as address input data to memory array 14. Output from ABIST controller 12 is also fed via ABIST line 24 to another 2:1 multiplexer circuit labeled in FIG. 1 as multiplexer circuit 35. A functional data line 29 also provides input to multiplexer circuit 35. Functional data is provided, via functional data line 29, from an outside source (i.e., not shown) to multiplexer circuit 35. Output from multiplexer circuit 35 is fed as "data in" via "data in" line 30 to memory array 14. In addition, ABIST line 24 is also routed as input to compare logic 16. Output from memory array 14 is also fed to compare logic 16. ABIST controller 12 writes and reads patterns to and from memory array 14 while incrementing and decrementing through an entire address range. Comparisons are performed after each read of memory array 14 to determine if the write and read operations were successful. Miscompares indicate a defect in the memory array silicon.

A memory in this context can include a hierarchy of multiple, smaller memories joined to form a larger more complex memory. The primary design consideration, which has driven the utilization of hierarchical arrays, is performance. Each array size is defined by a bit width and a word length. Sub-arrays typically share common word length and bit widths.

Figure 2:
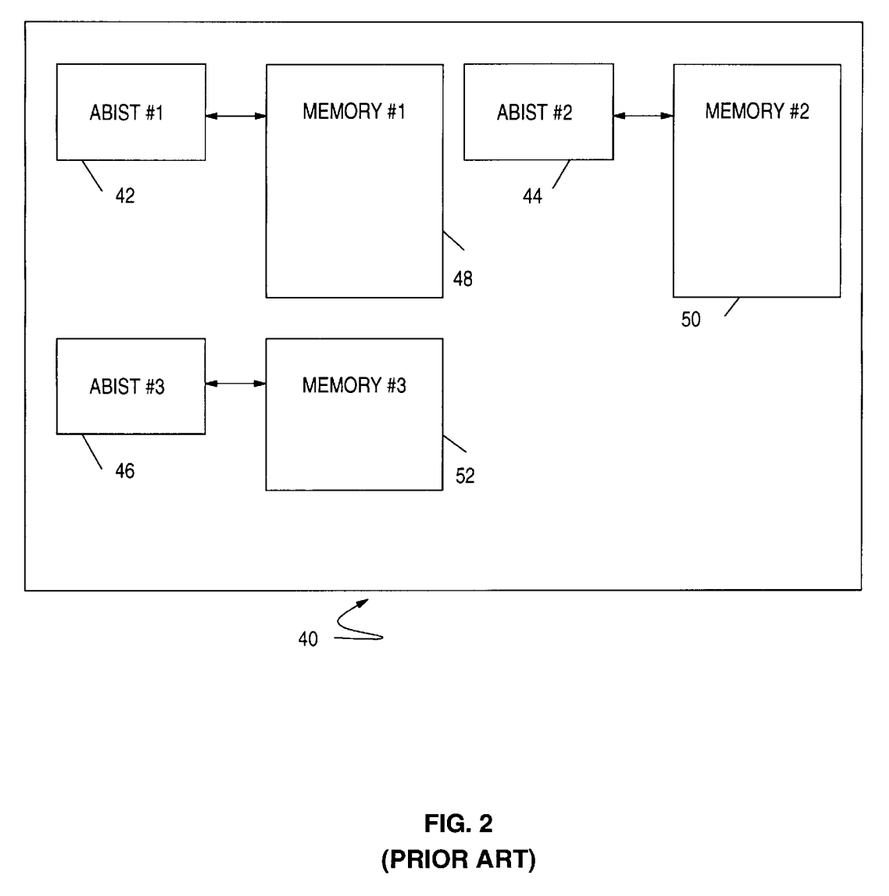
FIG. 2 depicts a prior art multiple ABIST testing configuration.

FIG. 2 depicts a prior art multiple ABIST testing configuration 40. It is not uncommon in modern integrated circuits to include multiple memories on a single chip. For example, embedded controllers may posses a memory array that functions as an instruction cache and another memory array that functions as a data cache. One approach to such testing of arrays has been to provide a separate and unique ABIST engine to test each memory array. The example depicted in FIG. 2 illustrates such a method of testing. In FIG. 2, memory arrays or memory devices are represented by rectangles of varying size and shape. A first memory array 48 is linked to a first ABIST controller 42, while a second memory array 50 is linked to a second ABIST controller 44. Finally, a third memory array 52 is linked to a third ABIST controller 46. The method of testing depicted in FIG. 2 is indicated by the different sized rectangles representative of the aforementioned memory arrays. Such a method has the advantage of allowing multiple arrays to be tested concurrently. In such a manner, the test time is limited to the time needed to test the largest memory array at the expense of silicon for each ABIST controller included in the testing configuration.

Figure 3:
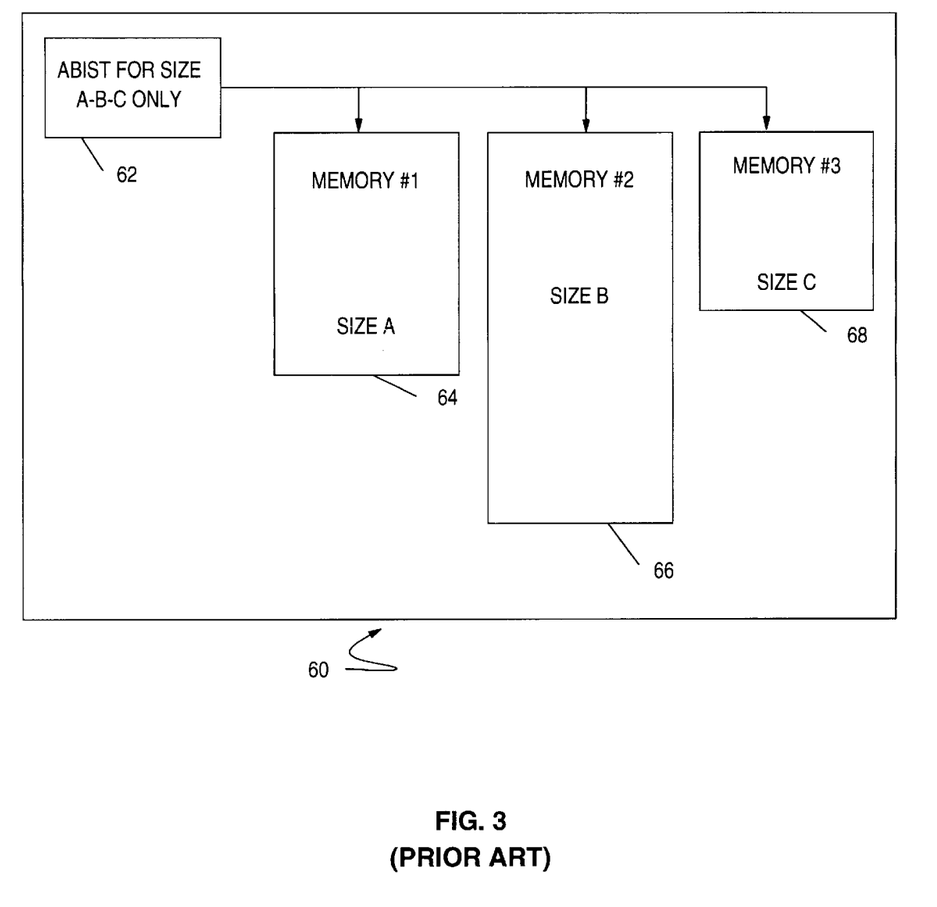
FIG. 3 illustrates a prior art single ABIST for known, fixed memory array sizes.

FIG. 3 illustrates a prior art single ABIST testing configuration 60 for known, fixed memory array sizes. The testing configuration depicted in FIG. 3 includes a single fixed ABIST controller 62 for testing multiple arrays of known sizes. Thus, a first memory array 64 has a size A. A second memory array 66 has a size B, while a third memory array 68 has a size C. ABIST controller 62 can only be utilized for testing purposes with either a size A, size B, or size C memory array. The smaller arrays (e.g., size A and size C) may be tested multiple times as the entire address range of the largest array (e.g., size B) is cycled through a testing phase. The approach depicted in FIG. 3 requires that compare results of the smaller array be ignored when the test exceeds their address ranges. Such an approach has the advantage of testing all memory arrays concurrently without the added area of multiple ABIST controllers. A problem inherent with this approach, however, is that different combinations of array sizes require a unique ABIST controller to that specific combination of arrays.

Figure 4:
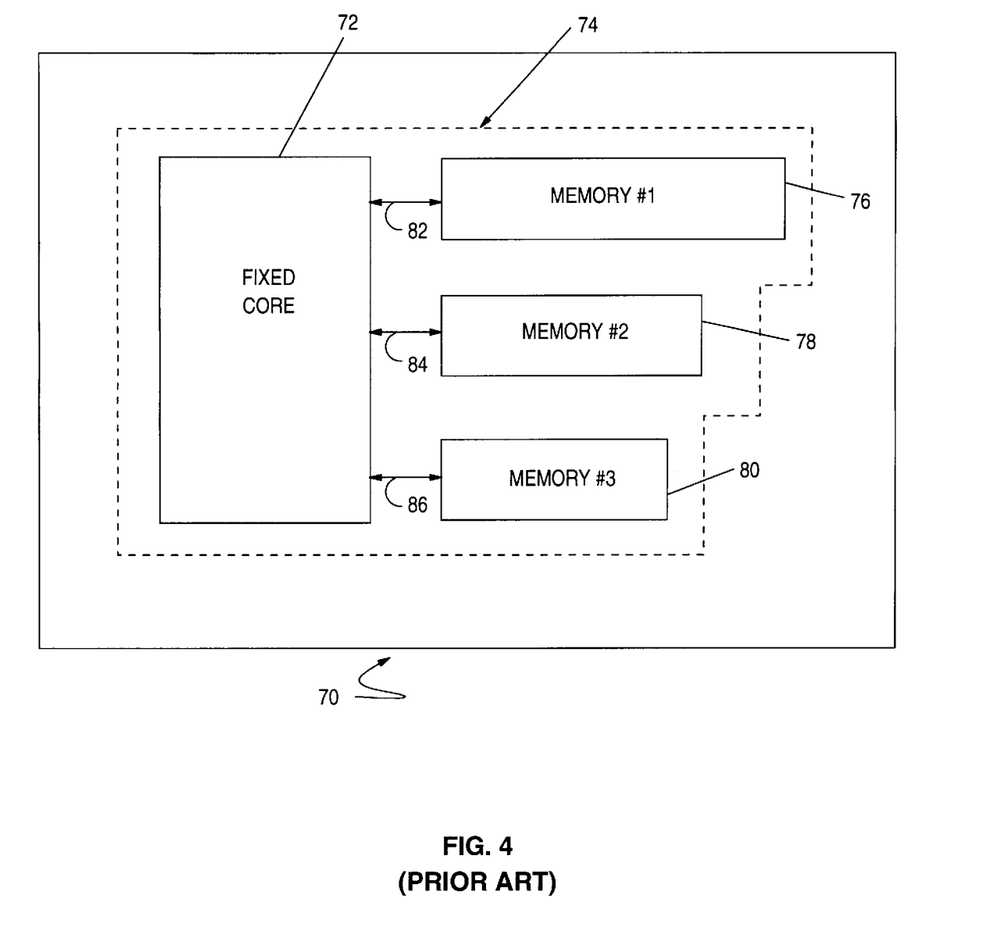
FIG. 4 depicts a fixed core and attached memory arrays.

FIG. 4 depicts a testing configuration 70 that includes a prior art fixed core 72 and attached memory arrays. In FIG. 4, the fixed core is attached, via line 82, to a first memory array 76. Fixed core 72 is also attached, via line 84, to a second memory array 78. In addition, fixed core 72 is attached, via line 86, to a third memory array 80. As integration continues to improve, the utilization of core-plus ASIC (C+A) or systems-on-silicon designs, have increased. Such an increase has led to an increased need for design reuse. This is particularly evident in C+A designs, well known in the art of integrated circuits, that require the use of a fixed core that has attached memory arrays of varying sizes. The memory arrays are attached to the fixed core as needed for a desired application. Thus, the desired size of the memory arrays can change depending on customer requirements, as specifically indicated in the example illustrated in FIG. 4. Because, the desired size of the memory arrays can change, the previous testing approaches described herein are undesirable. For example, the approach in which separate ABIST controllers are utilized for each array, waste silicon area and require a separate design for each different sized array. The approach in which single controller for fixed sizes is utilized reduces area but would need to be redesigned for each sized combination of arrays. The solution to these problems is described in the text related to FIG. 5 herein.

Figure 5:
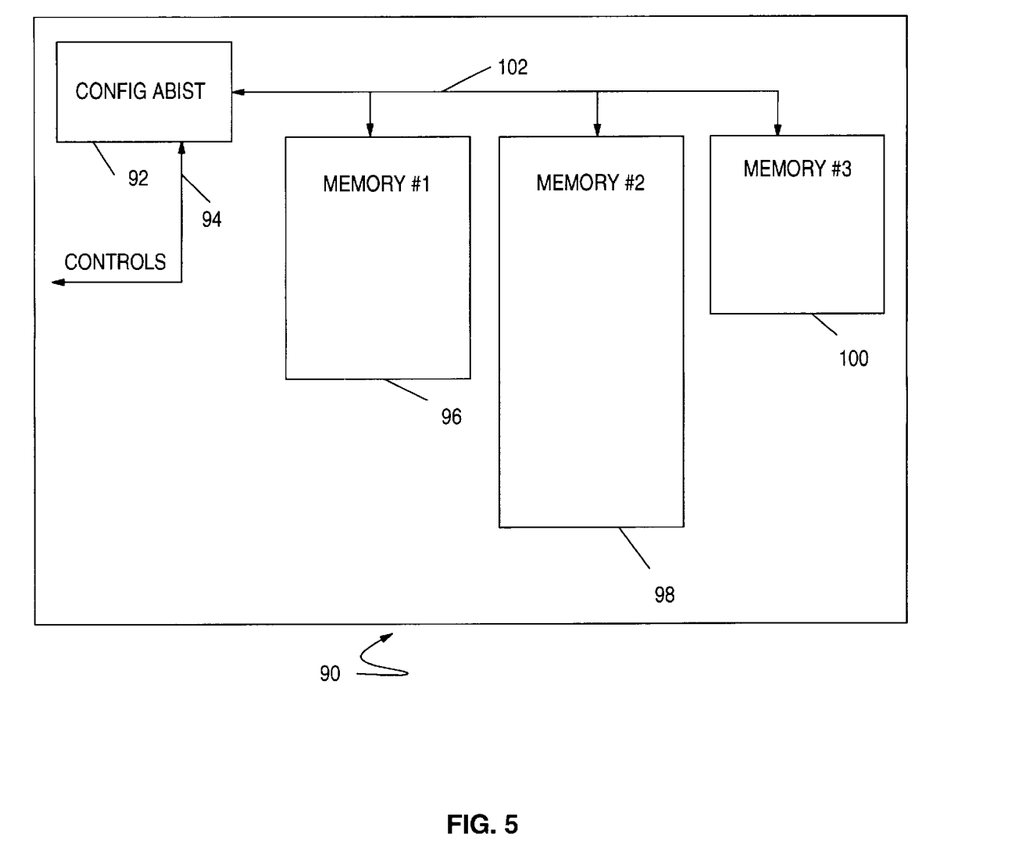
FIG. 5 illustrates a configurable ABIST controller in accordance with a preferred embodiment of the present invention.

FIG. 5 illustrates a testing configuration 90 that includes a configurable ABIST controller 92, in accordance with a preferred embodiment of the present invention. In FIG. 5, a single configurable ABIST controller 92 is linked via line 102 to a first memory array 96, a second memory array 98, and a third memory array 100. ABIST controller 92 is designed to work with a variety of different sized memory arrays. ABIST controller 92 need only be designed once and can then either be utilized within a fixed core or outside the fixed core. Such an approach allows for reuse of the controller which results in design time savings, verification time savings, and improved time to market for different array combinations, while saving silicon area and maintaining a reduced testing time. A "controls" line 94 is linked to control circuitry (not shown in FIG. 5).

Figure 6:
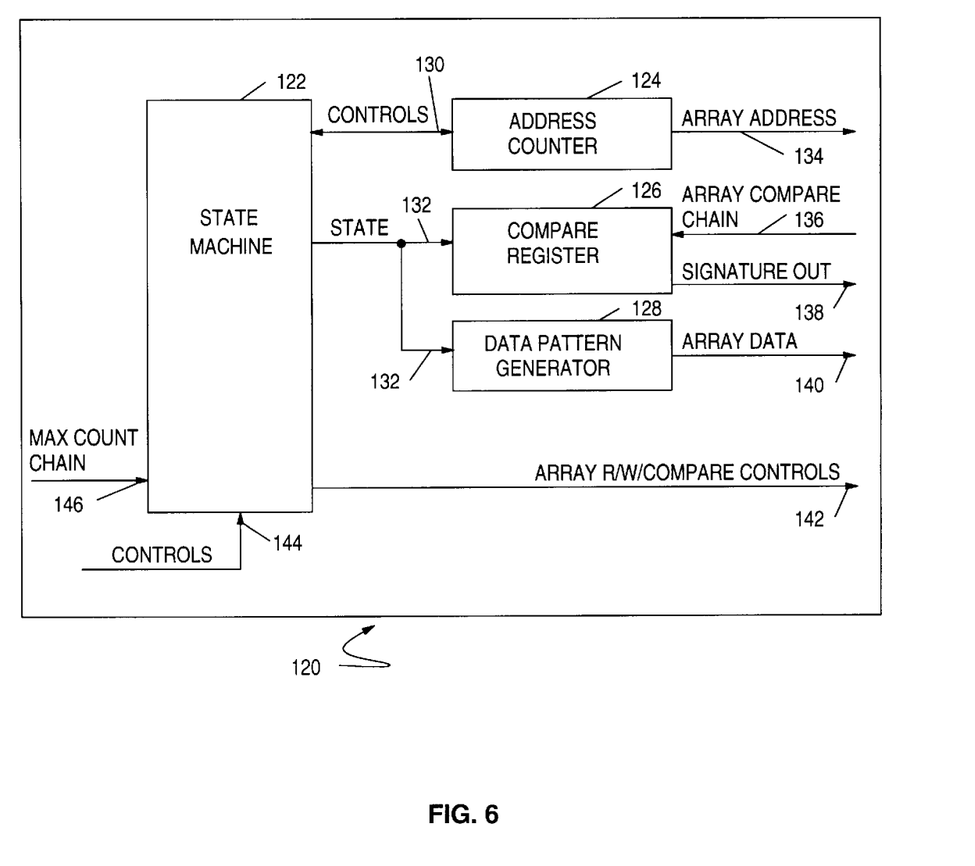
FIG. 6 depicts a block diagram illustrative of a configurable ABIST controller, in accordance with a preferred embodiment of the present invention.

FIG. 6 depicts a block diagram illustrative of a configurable ABIST controller 120, in accordance with a preferred embodiment of the present invention. The type of configurable ABIST controller 120 depicted in the example of FIG. 6 is divided into separate blocks: an ABIST state machine 122, an address counter 124, a compare register 126, and a data pattern generator 128. ABIST controller 120 is a type of single reusable configurable test circuit. Address counter 124 is coupled to state machine 122 via "controls" line 130. A "max count chain" input line 146 additionally provides input to state machine 122. A "controls" line 144 also provides input to state machine 122. Array address output is provided by address counter 124 at line 134. State output is provided by state machine 122 at lines 132. Line 132 is fed to compare register 126 and data pattern generator 128. Array compare chain data is fed to compare register at line 136 while signature data output is fed from compare register 126 at line 138. Array data output from data pattern generator 128 can be accessed at line 140. Array read/write and compare controls output provided by state machine 122 can be accessed at line 142.

ABIST controller 120 receives a max count signal at line 146 that allows ABIST controller 120 to be aware of when a generated address is outside a range of all memory arrays and has completed incrementing through all necessary addresses. ABIST controller 120 also receives compare signals from the memory arrays that indicate any miscompares. The ABIST controller produces addresses, data, and read/write compare control signals for the memory arrays, which can be accessed at line 142. After an ABIST test is complete, the results are provided in the form of a signature output from compare register 126 at output line 138. All of the latches necessary to implement state machine 122, address counter 124, and compare register 126 can be multiplexed with functional registers.

In this manner, the only additional silicon necessary to construct the configurable ABIST controller is reserved for the logic of the next state equations, an increment/decrement function, pattern generation, controls, and a two-to-one multiplexor function to steer the ABIST equations in the latch in test mode and the functional equations in the latch otherwise. ABIST state machine 122 controls the number of iterations, the incrementing and decrementing of the addresses, when to examine array compare signals, and when to switch data patterns as well as read/write controls. No changes to ABIST state machine 122 are necessary to test multiple arrays of different sizes.

Address counter 124 is utilized to address each memory array or memory unit to be tested. The address is incremented and decremented through the entire address range of the largest memory array. For smaller arrays, testing is suspended after address counter 124 has fully addressed the smaller arrays. Testing is resumed when address counter 124 returns to a desired range. To facilitate this approach in the implementation depicted in FIG. 6, a maximum count signal is created to indicate when the last line of a memory array or a memory sub array (i.e., a smaller part of a larger array) has been addressed. An example of this approach is illustrated in FIG. 7.

Figure 7:
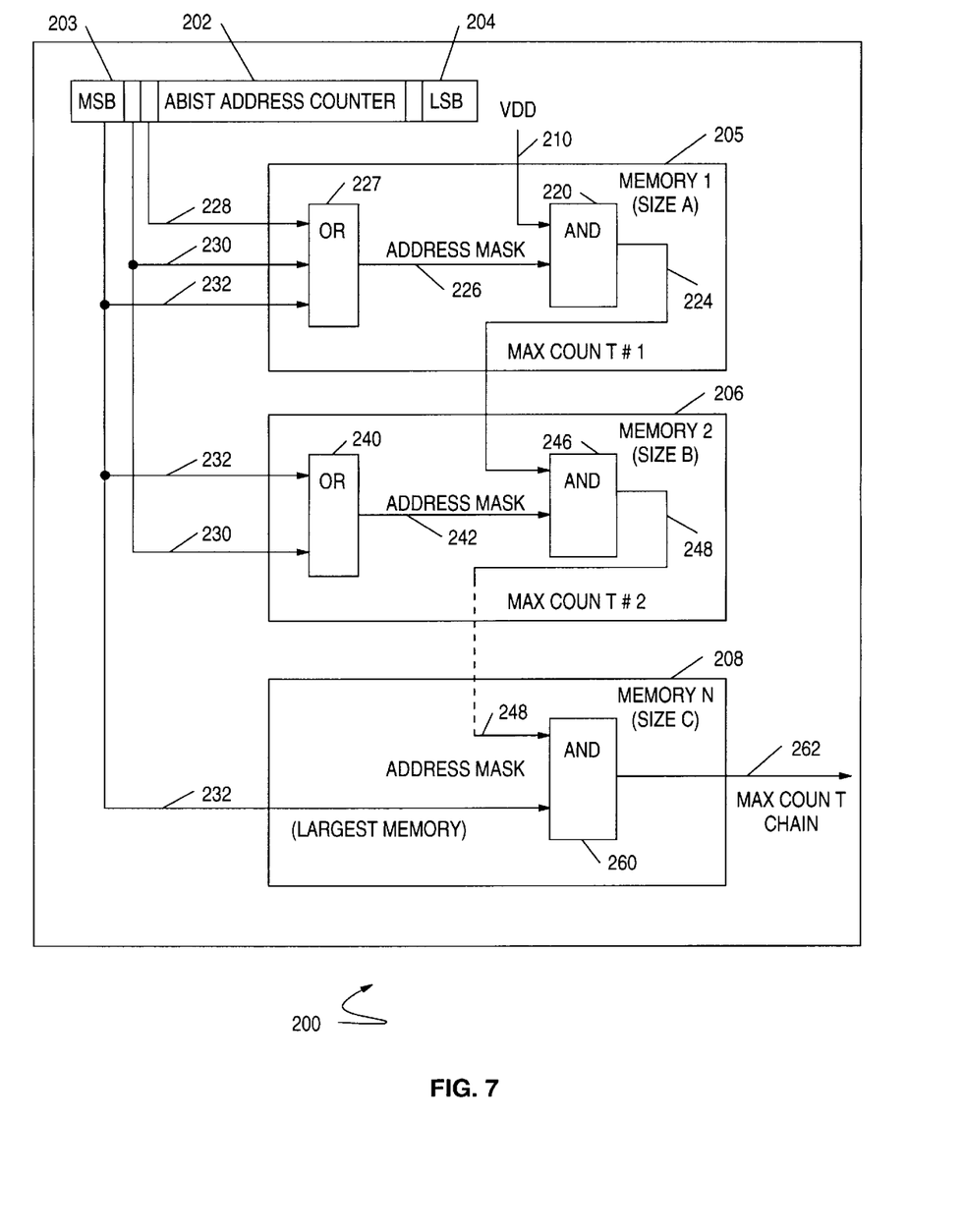
FIG. 7 illustrates a block diagram illustrative of the utilization of combinational logic to detect multiple sized memory, in accordance with a preferred embodiment of the present invention.

FIG. 7 illustrates a block diagram 200 illustrative of the utilization of combinational logic to detect multiple sized memory, in accordance with a preferred embodiment of the present invention. In the example depicted in FIG. 7, a first memory array 205, a second memory array 206 and an "Nth" memory array 208 are respectively coupled to ABIST address counter 202, which is analogous to address counter 124 depicted in FIG. 6. First memory array 205 includes a memory array of size A. Second memory array 206 includes a memory array of size B, and "Nth" memory array 208 includes a memory array of size C. Each memory array includes a generated address mask.

First memory array 205 includes an address mask 226 which is generated as output from OR circuit 227. Second memory array 206 includes an address mask 242 which is generated as output from OR circuit 240. "Nth" memory array 208 includes an address mask which is generated as output from ABIST address counter 202. In first memory array 205, address mask 226 generated as output from OR circuit 227 is provided as input to AND circuit 220. In addition, a power supply 210, labeled as $V_{dd}$, is provided as input to AND circuit 220. AND circuit 220 provides a first maximum count signal which is fed via line 224 to AND circuit 246 contained within second memory array 206. In second memory array 206, address mask 242 provided by OR circuit 240 is fed as input to AND circuit 246, along with the first maximum count signal provided as output from AND circuit 220 of first memory array 205. A second maximum count signal is provided as output from AND circuit 246 via line 248 and coupled to AND circuit 260 maintained within "Nth" memory array 208. A maximum count chain signal is provided as output from AND circuit 260 via line 262.

ABIST address counter 202 is coupled via various lines to the memory arrays. ABIST address counter 202 includes a most-significant bit (MSB) unit 203 which is coupled via line 232 to AND circuit 260, OR circuit 240, and OR circuit 227. MSB data is thus provided to AND circuit 260 as address mask data. ABIST address counter 202 also includes a least-significant bit unit 204. ABIST address counter 202 is further coupled to OR circuit 240 via line 230 and to OR circuit 227 via line 230. In addition, line 228 is coupled to ABIST address counter 202 and OR circuit 207.

In general, when the address mask is logic '0,' then the value of ABIST address counter 202 is a valid address for that array. When the address mask is a logic '1," then the value of ABIST address counter 202 exceeds the address space of that particular array. When ABIST address counter 202 exceeds the address range of a particular array, one or more of the upper order addresses are a logic '1' value. Logic values such as '1' or '0' respectively indicate a voltage of $V_{dd}$ or 0 volts. The logical "ORing" of used upper order address bits for a particular sized array indicates the time when ABIST address counter 202 is out of range of that particular array. For the maximum sized array, the most significant bit of ABIST address counter 202 is not utilized to address the array. Rather, the most significant bit (MSB) is utilized to indicate when the maximum count has been reached for the largest possible array. The bit width of ABIST address counter 202 is one bit larger than necessary to address the largest array. For such a case, ABIST address counter 202 is utilized to signal the maximum count. The address mask is then processed through an AND operation, as indicated by AND circuit 248, through a daisy-chained approach to create a maximum count signal which indicates that all arrays have been addressed. The maximum count chain is a logic '1' when all arrays or sub-arrays have been addressed.

The largest sized array that can be tested is determined by the number of bits utilized for ABIST address counter 202. This approach provides the benefit of allowing memories to be tested whose size is not limited to a $2^n$ factor size. In the example of FIG. 7, the utilization of memories having powers of two are illustrated. Those skilled in the art will appreciate, however, that other combinational logic can be utilized to detect any size memory. Note that the latches which comprise the address counter can be multiplexed with functional registers. Those skilled in the art will further appreciate that overhead for the controller can include a two-to-one multiplexer which shares the functional register, and the increment and decrement logic for unused bits.

Figure 8:
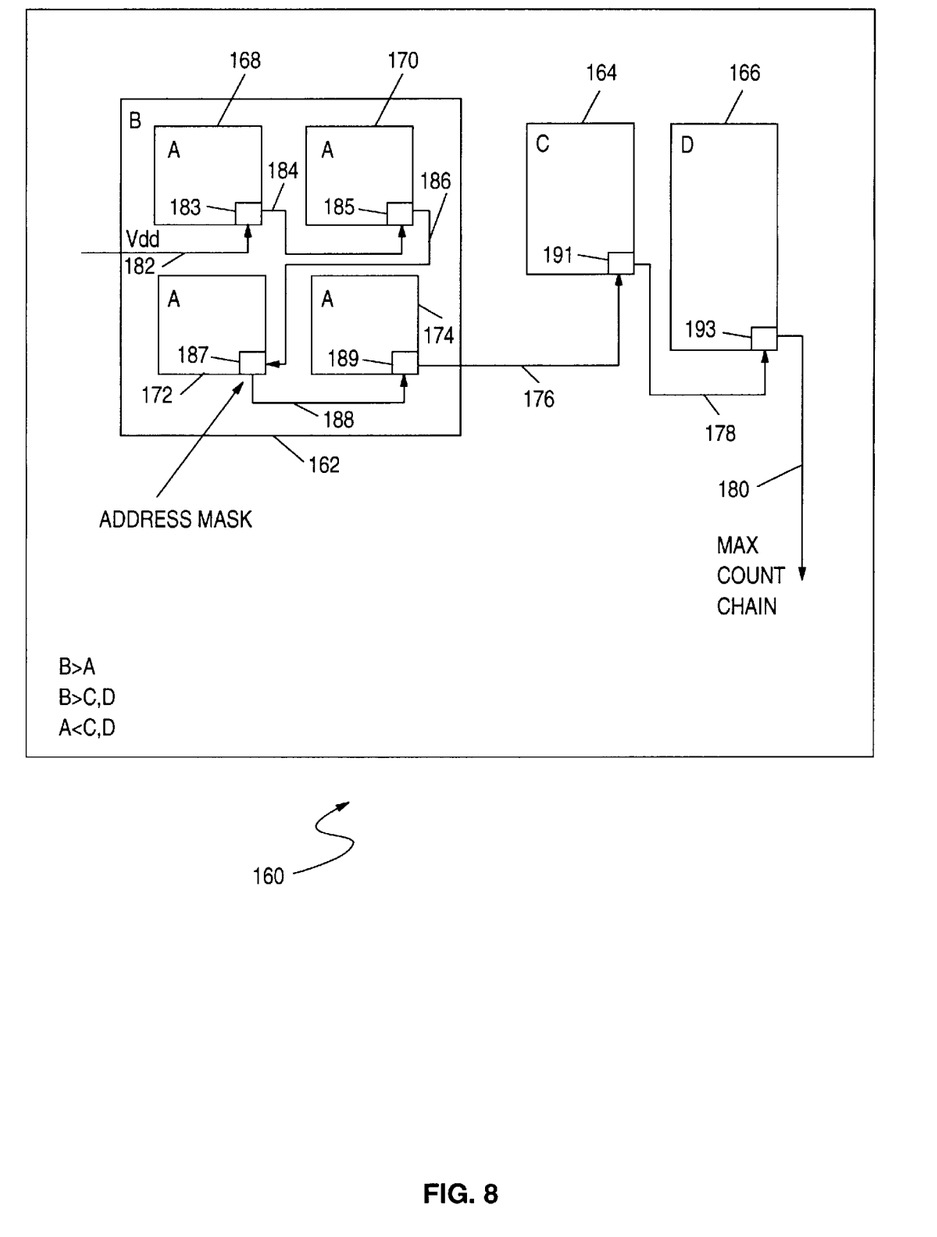
FIG. 8 depicts a memory configuration of three memory arrays in accordance with a preferred embodiment of the present invention.

FIG. 8 depicts a memory configuration 160 of three memory arrays in accordance with a preferred embodiment of the present invention. Memory array 162, which is labeled B, is the largest of the three arrays, and is configured hierarchically utilizing four sub-arrays: sub-arrays 168, 170, 172, and 174. Each of these sub-arrays are designated as A sub-arrays. The A sub-arrays are smaller than the C and D arrays, which are respectively represented by sub-array 164 and 166. A $V_{dd}$ power supply line 182 is connected to sub-array 168 at address mask 183. An output line 184 from sub-array 168 is fed to sub-array 170 at address mask 185. An output line 186 from sub-array 170 is fed to sub-array 172 at address mask 187. An output line 188 is fed from sub-array 172 to sub-array 174 at address mask 189. An output line 176 is fed from sub-array 174 to array 16 4 at address mask 191. An output line 178 is fed from array 164 to array 166 at address mask 193. A "max count chain" output line 180 is coupled to array 166 at address mask 193.

In this configuration, two options for test exist. If the size of an address counter is consistent with memory B (i.e., array 162), then the approach discussed and illustrated in FIG. 7 can be employed. If the size of the address counter size is smaller than necessary to address memory B, but larger than required to test array C (i.e., array 164) or D (i.e., array 166), or if reduced test time is desired, then the inherent hierarchy of memory B can be employed. In this case, address masks (i.e., address masks 183, 185, 187 and 189) are created for each of the sub-arrays. A "max count" signal for each of these sub-arrays are daisy chained together, and then fed into the other array's mask generation to create a "max count chain." The use of such a hierarchy assists in enabling reuse of the configurable ABIST controller over a broad range of memory sizes. The use of such a hierarchy also promotes test time reduction, as test time is dictated by the largest array or sub-array being tested. To further reduce test time, the other arrays, C and D, can be configured hierarchically similarly and this above approach employed.

A compare register is utilized to hold any miscompares that occur during testing of the arrays. This register can be used to determine if there are any defects in any memory or it can flag which array or sub-array may have a defect. The compare signals from the arrays can be logically read to have only one compare input to the ABIST controller, which indicates a pass or fail without the ability to identify which array or arrays is failing. It is also possible for each array to send a separate compare signal to the ABIST controller which allows for isolation of the failing array for diagnostics, but requires a latch for each compare line. Alternatively, the compare signals can be daisy chained to create a single compare as shown in FIG. 9.

Figure 9:
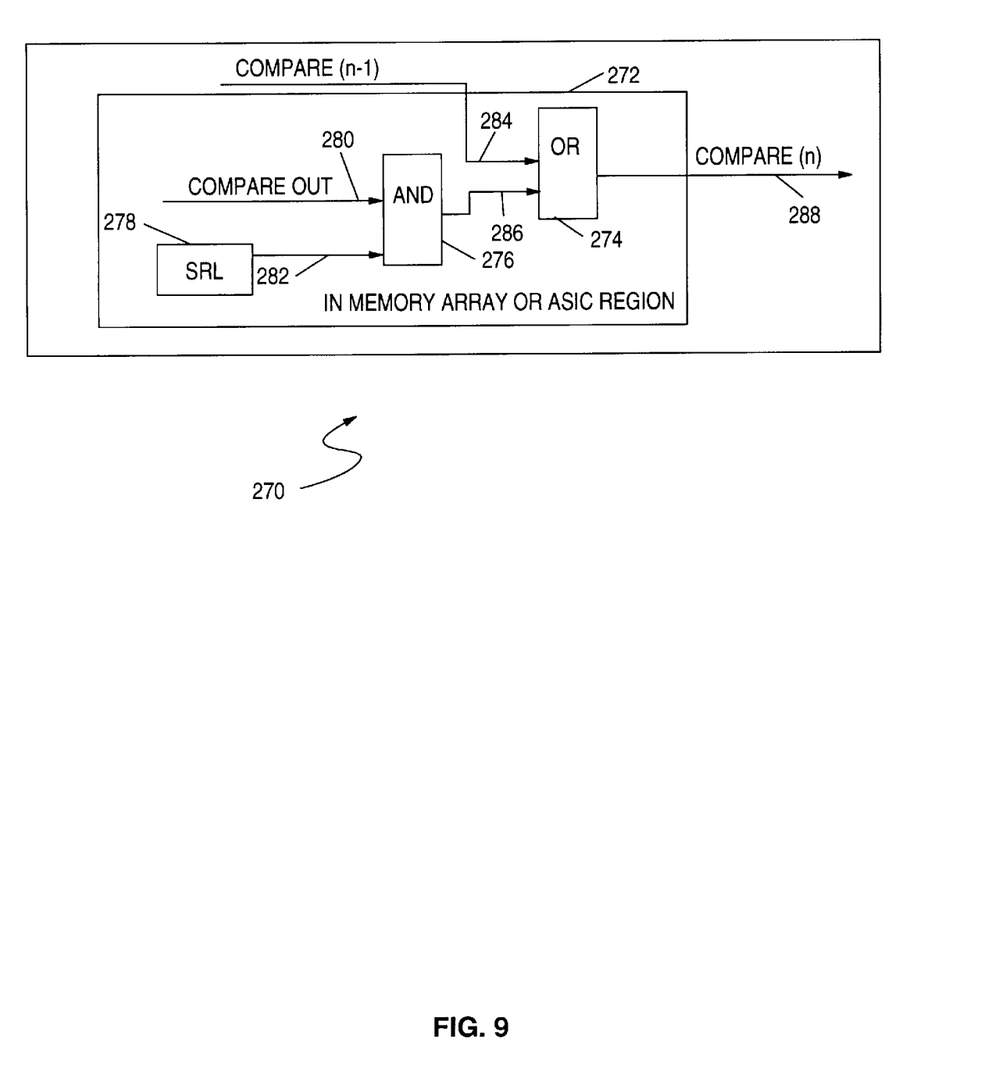
FIG. 9 illustrates compare generation for single compare with diagnostics, in accordance with a preferred embodiment of the present invention.

FIG. 9 illustrates a compare generation configuration 270 for single compare with diagnostics, in accordance with a preferred embodiment of the present invention. Scanning a 'O' into SRL 278 of FIG. 9 can be utilized to disable all but the array under test for diagnostics. SRL 278 provides output via output line 282 as input to AND circuit 276. A compare out signal is also provided as input via line 280 to AND circuit 276. Output from AND circuit 286 is provided as input to OR circuit 274 via line 286. In addition, "compare (n−1)" input data is provided to OR circuit 274 via input line 284. These elements are contained within a memory array or ASIC region 272 whose output is provided as "compare (n)" data via line 288. Line 288 is essentially an output line coupled to OR circuit 274. In this manner, the ABIST controller need only have one compare input and a single compare latch and still be able to provide fault isolation for any number of arrays. The data pattern generator described herein can be utilized to create input data that is required to test for defects in the array.

Data that is required to test these defects depend on the physical implementation of the arrays. For some array patterns, blanket 'O's, blanket '1's, checker-board and inverse checker boards are enough to test for all failure modes in the array. Data created by the generator can be applied to the arrays by multiplexing it with functional data inputs. In essence, the illustration of FIG. 9 depicts a configuration which minimizes the overhead of compare/control circuitry by daisy-chaining the compare function. Those skilled in the art will appreciate that the compare function described herein which is associated with reusable ABIST controller not only allows the ABIST controller to detect a pass or fail for the arrays in total, but also promotes a configuration such that detection of a fail can be isolated to the offending array for diagnostics. In other words, the ABIST controller's compare function promotes a unique fault isolation capability.

A single configurable ABIST controller has been described and illustrated, which provides for multiple memory arrays of varying sizes which are not limited to $2^n$ multiples of one another and which can be tested concurrently. The maximum size of the tested memory array is defined by the number of words, number of bits, and the number of sub-arrays. The address counter size defines the maximum number of words that any array or sub-array can have and still be tested. The counter isn't a limitation to the absolute size of the array or sub-array that can be tested. To enable larger memory sizes or memories which are organized hierarchically, this scheme allows hierarchical concurrent testing of sub-arrays of the arrays. This scheme illustrates a method to minimize the overhead of the compare/control circuitry by daisy-chaining the compare function. Also illustrated is a technique for testing memory devices with and without diagnostics (i.e., manufacturing test mode or fault analysis mode). Such an approach promotes the re-use of the same configurable test circuit within a re-usable core, ASIC, or core-plus-ASIC implementations. The re-usable elements include state machine, data pattern generator, compare register, and address counter circuitry as described herein. The approach of daisy-chaining the "max count" and compare functions further enables re-use of these blocks, which further extends the re-use of the entire configurable ABIST controller. Thus, those skilled in the art can appreciate that the technology described and illustrated herein provides diagnostics as to which integrated circuit device failed even though such devices are tested in parallel.

The embodiments and examples set forth herein are presented in order to best explain the present invention and its practical application and, thereby, to enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method for manufacturing integrated circuit devices having multiple memory units embedded therein, said method comprising the steps of:
    fabricating a single reusable configurable test circuit within an integrated circuit device;
    identifying a number and type of each memory unit embedded within said integrated circuit device; and
    configuring said single reusable configurable test circuit, in response to said identifying of a number and type of each memory unit, such that only a single reusable configurable test circuit is required for use with multiple integrated circuit devices having multiple diverse memory units embedded therein.

2. The method of claim 1 wherein the step of fabricating a single reusable configurable test circuit within an integrated circuit device, further comprises the step of:
    fabricating a single reusable configurable test circuit within an integrated circuit device, wherein said single reusable configurable test circuit comprises an array built-in self test circuit that detects manufacturing defects within each memory unit.

3. The method of claim 2 wherein the step of fabricating a single reusable configurable test circuit within an integrated circuit device, wherein said single reusable configurable test circuit comprises an array built-in self test circuit that detects manufacturing defects within each memory unit, further comprises the step of:
    fabricating a single reusable configurable test circuit within an integrated circuit device, wherein said single reusable configurable test circuit comprises an array built-in self test circuit that detects manufacturing defects within each memory unit such that each memory unit comprises a hierarchical memory configuration having at least one memory array.

4. The method of claim 3 wherein the step of fabricating a single reusable configurable test circuit within an integrated circuit device, wherein said single reusable configurable test circuit comprises an array built-in self test circuit that detects manufacturing defects within each memory unit such that each memory unit comprises a hierarchical memory configuration having at least one memory array, further comprises the step of:
    fabricating a single reusable configurable test circuit within an integrated circuit device, wherein said single reusable configurable test circuit comprises an array built-in self test circuit that detects manufacturing defects within each memory unit such that each memory unit comprises a hierarchical memory configuration having at least one memory array, wherein said hierarchical memory configuration includes a plurality of daisy chained sub-arrays whose output is fed to at least one subsequent array mask generator of at least one other memory array to create a maximum count chain output.

5. The method of claim 4 wherein the step of fabricating a single reusable configurable test circuit within an integrated circuit device, further comprises the step of:
    fabricating a single reusable configurable test circuit within an integrated circuit device, wherein said single reusable configurable test circuit comprises a single reusable ABIST controller.

6. The method of claim 5 wherein the step of fabricating a single reusable configurable test circuit within an integrated circuit device, wherein said single reusable configurable test circuit comprises an array built-in self test circuit that detects manufacturing defects within each memory unit, further comprises the steps of:
    coupling a state machine circuit via at least one output control line to an address counter;
    connecting said state machine to a compare register and to a data pattern generator via at least one state line;
    connecting to said state machine at least one maximum count chain input line wherein said at least one maximum count chain input line carries maximum count chain input data to said state machine;
    providing at least one control input line to said state machine wherein said at least one control input line carries external control input data to said state machine;
    connecting to said compare register at least one signature output line for carrying signature output data from said compare register;
    providing at least one array compare chain line for carrying array compare chain data to said compare register;
    coupling at least one array data output line to said data pattern generator such that said at least one array data output line carries array data provided by said data pattern generator; and
    connecting to said state machine at least one line for carrying array read/write and compare control data from said state machine.

7. The method of claim 6 further comprising the step of placing said single reusable configurable test circuit within or outside a fixed core of said integrated circuit device.

8. The method of claim 7 wherein the step of providing at least one array compare chain line for carrying array compare chain data to said compare register, further comprises the step of:

providing at least one array compare chain line for carrying array compare chain data to said compare register, such that said at least one array compare chain line comprises a single compare line derived from a daisy chain configuration of compare signals.

9. The method of claim 8 wherein the step of fabricating a single reusable configurable test circuit within an integrated circuit device, wherein said single reusable configurable test circuit comprises a single reusable ABIST controller, further comprises the step of:

fabricating a single reusable configurable test circuit within an integrated circuit device, wherein said single reusable configurable test circuit comprises a single reusable ABIST controller, such that said ABIST controller need only include one compare input and a single compare latch to provide fault isolation for any number of arrays.

10. The method of claim 9 wherein the step of providing at least one array compare chain line for carrying array compare chain data to said compare register, such that said at least one array compare chain line comprises a single compare line derived from a daisy chain configuration of compare signals, further comprises the step of:

providing at least one array compare chain line for carrying array compare chain data to said compare register, such that said at least one array compare chain line comprises a single compare line derived from a daisy chain configuration of compare signals, wherein said compare register can detect a pass or fail for arrays in total.

11. The method of claim 10 wherein the step of providing at least one array compare chain line for carrying array compare chain data to said compare register, such that said at least one array compare chain line comprises a single compare line derived from a daisy chain configuration of compare signals, further comprises the step of:

providing at least one array compare chain line for carrying array compare chain data to said compare register, such that said at least one array compare chainline comprises a single compare line derived from a daisy chain configuration of compare signals, wherein said compare register allows said single reusable configurable test circuit to detect a fail that can be isolated to an offending array for diagnostics.

12. A system for manufacturing integrated circuit devices having multiple memory units embedded therein, said method comprising:

means for fabricating a single reusable configurable test circuit within an integrated circuit device;

means for identifying a number and type of each memory unit embedded within said integrated circuit device; and means for configuring said single reusable configurable test circuit, in response to said identifying of a number and type of each memory unit, such that only a single reusable configurable test circuit is required for use with multiple integrated circuit devices having multiple diverse memory units embedded therein.

13. The system of claim 12 wherein said means for fabricating a single reusable configurable test circuit within an integrated circuit device, further comprises:

means for fabricating a single reusable configurable test circuit within an integrated circuit device, wherein said single reusable configurable test circuit comprises an array built-in self test circuit that detects manufacturing defects within each memory unit.

14. The system of claim 13 wherein said means for fabricating a single reusable configurable test circuit within an integrated circuit device, wherein said single reusable configurable test circuit comprises an array built-in self test circuit that detects manufacturing defects within each memory unit, further comprises:

means for fabricating a single reusable configurable test circuit within an integrated circuit device, wherein said single reusable configurable test circuit comprises an array built-in self test circuit that detects manufacturing defects within each memory unit such that each memory unit comprises a hierarchical memory configuration having at least one memory array.

15. The system of claim 14 wherein said means for fabricating a single reusable configurable test circuit within an integrated circuit device, wherein said single reusable configurable test circuit comprises an array built-in self test circuit that detects manufacturing defects within each memory unit such that each memory unit comprises a hierarchical memory configuration having at least one memory array, further comprises:

means for fabricating a single reusable configurable test circuit within an integrated circuit device, wherein said single reusable configurable test circuit comprises an array built-in self test circuit that detects manufacturing defects within each memory unit such that each memory unit comprises a hierarchical memory configuration having at least one memory array, wherein said hierarchical memory configuration includes a plurality of daisy chained sub-arrays whose output is fed to at least one subsequent array mask generator of at least one other memory array to create a maximum count chain output.

16. The system of claim 15 wherein said means for fabricating a single reusable configurable test circuit within an integrated circuit device, further comprises:

means for fabricating a single reusable configurable test circuit within an integrated circuit device, wherein said single reusable configurable test circuit comprises a single reusable ABIST controller.

17. The system of claim 16 wherein said means for fabricating a single reusable configurable test circuit within an integrated circuit device, wherein said single reusable configurable test circuit comprises an array built-in self test circuit that detects manufacturing defects within each memory unit, further comprises:

means for coupling a state machine circuit via at least one output control line to an address counter;

means for connecting said state machine to a compare register and to a data pattern generator via at least one state line;

means for connecting to said state machine at least one maximum count chain input line wherein said at least one maximum count chain input line carries maximum count chain input data to said state machine;

means for providing at least one control input line to said state machine wherein said at least one control input line carries external control input data to said state machine;

means for connecting to said compare register at least one signature output line for carrying signature output data from said compare register;

means for providing at least one array compare chain line for carrying array compare chain data to said compare register;

means for coupling at least one array data output line to said data pattern generator such that said at least one array data output line carries array data provided by said data pattern generator; and means for connecting to said state machine at least one line for carrying array read/write and compare control data from said state machine.

18. The system of claim 17 further comprising means for placing said single reusable configurable test circuit within or outside a fixed core of said integrated circuit device.

19. The system of claim 18 wherein said means for providing at least one array compare chain line for carrying array compare chain data to said compare register, further comprises:

means for providing at least one array compare chain line for carrying array compare chain data to said compare register, such that said at least one array compare chain line comprises a single compare line derived from a daisy chain configuration of compare signals.

20. The system of claim 19 wherein said means for fabricating a single reusable configurable test circuit within an integrated circuit device, wherein said single reusable configurable test circuit comprises a single reusable ABIST controller, further comprises:

means for fabricating a single reusable configurable test circuit within an integrated circuit device, wherein said single reusable configurable test circuit comprises a single reusable ABIST controller, such that said ABIST controller need only include one compare input and a single compare latch to provide fault isolation for any number of arrays.

21. The system of claim 20 wherein said means for providing at least one array compare chain line for carrying array compare chain data to said compare register, such that said at least one array compare chain line comprises a single compare line derived from a daisy chain configuration of compare signals, further comprises:

means for providing at least one array compare chain line for carrying array compare chain data to said compare register, such that said at least one array compare chain line comprises a single compare line derived from a daisy chain configuration of compare signals, wherein said compare register c an detect a pass or fail for arrays in total.

22. The system of claim 21 wherein said means for providing at least one array compare chain line for carrying array compare chain data to said compare register, such that said at least one array compare chain line comprises a single compare line derived from a daisy chain configuration of compare signals, further comprises:

means for providing at least one array compare chain line for carrying array compare chain data to said compare register, such that said at least one array compare chain line comprises a single compare line derived from a daisy chain configuration of compare signals, wherein said compare register allows said single reusable configurable test circuit to detect a fail that can be isolated to an offending array for diagnostics.

* * * * *